United States Patent

Muto

[11] Patent Number: 5,490,180
[45] Date of Patent: Feb. 6, 1996

[54] DIVERSITY RECEIVER

[75] Inventor: Hiroyasu Muto, Tokyo, Japan

[73] Assignee: NEC Corporation, Tokyo, Japan

[21] Appl. No.: 351,072

[22] Filed: Nov. 30, 1994

[30] Foreign Application Priority Data

Nov. 30, 1993 [JP] Japan ................... 5-300254

[51] Int. Cl.⁶ ............................................. H04B 7/10
[52] U.S. Cl. .......................... 375/347; 455/137; 455/273
[58] Field of Search .......................... 375/267, 344, 375/345, 347; 455/133–137, 273, 277.1, 277.2

[56] References Cited

U.S. PATENT DOCUMENTS

| 4,210,871 | 7/1980 | Hill et al. ................... | 455/273 |
|---|---|---|---|
| 4,733,402 | 3/1988 | Monsen ....................... | 375/347 |
| 5,127,025 | 6/1992 | Okanoue ...................... | 375/347 |
| 5,297,171 | 3/1994 | Koch ............................ | 375/347 |
| 5,335,359 | 8/1994 | Tsujimoto et al. ............ | 455/52.3 |
| 5,349,609 | 9/1994 | Tsujimoto ................... | 375/347 |

FOREIGN PATENT DOCUMENTS 1-278130  11/1989  Japan.

*Primary Examiner*—Young Tse
*Attorney, Agent, or Firm*—Foley & Lardner

[57] ABSTRACT

A diversity receiver having A/D converters (1a and 1b) each for converting one burst of reception signal on each branch into digital value, maximum power detectors (2a and 2b) each for detecting the maximum value in amplitude of the received signal within one burst, normalizers (3a and 3b) each for normalizing one burst of sample data, demodulators (4a and 4b) each for demodulating the data using the normalized data, a burst weight calculating block (6) for calculating a weight for each branch system based on the ratio of the maximum values in amplitude of each branch, weight controllers (5a and 5b) each for multiplying the one burst of demodulated data by a weight corresponding to each branch, a combiner (7) for combining the data on each branch at a maximum ratio, and a decoder (8) for decoding the combined data.

6 Claims, 2 Drawing Sheets

DIVERSITY RECEIVER

BACKGROUND OF THE INVENTION

1. Field of the Invention

The present invention relates to a diversity receiver, and more particularly to an improvement in a diversity receiver which performs converting burst signals received through a plurality of receiving branches into digital values, demodulating, maximum-ratio-combining, and decoding.

2. Description of the Related Art

In a conventional diversity receiver of signals at a maximum ratio of a maxmium-ratio-combination, the output signal of an AGC amplifier has been maintained within a predetermined range of level holding the differences in level of the signals received, by amplifying the signal of the most highest level in the reception branch systems up to a prescribed level, and providing the remaining branch systems with the same gain as that used in the selected branch system. It is to be called a kind of normalization. (Refer to Japanese Patent Laid-Open No. 278130/89).

FIG. 1 illustrates an example of a diversity receiver having two receiving branches, to which the above-mentioned conventional techniques are applied.

As clearly seen from the drawing, the diversity receiver has two branches as receiving branches and comprises A/D converters 21, 22, normalizers 24, 25 and demodulators 26, 27, each of which being used for stituting respective branches, in addition to a maximum power detector 23, a combiner 28 and a decoder 29, all of which being commonly used as indispensable constituents in the receiver. This diversity receiver completes a series of processing operations by converting the 10 burst signals received by respective branches into digital values over a period of one burst time at the respective A/D converters 21, 22, detecting one maximum value through two systems within the absolute value of sample data by the maximum power detector 23, normalizing each one burst of sample data by the normalizers 24, 25 on the respective branch systems on the basis of the detected maximum values, demodulating the normalized respective signals by the demodulators 26, 27, weighting the inputs from the demodulators 26, 27 on a symbol-by-symbol basis at the combiner 28 to combine them into one signal, and decoding the input from the combiner 28 by the decoder 29. Alternatively, a digital signal processor may be used for processing the signal after being converted into digital values.

The above-mentioned conventional diversity receiver operates to convert the received burst signals into digital values for a period of one burst time, detect one maximum value for the two branches from the absolute values of the sample data, normalize one burst of sample data on the receiving branches on the basis of the maximum values, demodulate the normalized data, perform a weighting combination on a symbol-by-symbol basis, and decode the weighted data to produce an output signal. The conventional diversity receiver suffers such disadvantages that the accuracy of demodulation for a branch having a low level will become worse when the level difference between the receiving branches is large, since the same gain as used in the receiving branch having a high level is offered to the receiving branch having a low level. In particular, in a case where the number of quantization bits for the A/D converter can not be made large, or a fixed point digital signal processor is used for signal processing, the receiving branch having a low level has a high probability of giving rise to an underflow in the course of carrying out demodulation processing, and in the worst case, sometimes no demodulation is possible.

In addition, in a case where the normalization of one burst of sample data is carried out by detecting the maximum value for one burst of sample data on a system-by-system basis independently, no aggravation in the accuracy of demodulation may occur even for a receiving branch having a low level. However, when there is no input from any one of the receiving branches, thermal noise will be amplified by normalization, so that the amplified thermal noise will be combined at the time of the combining operation, thus resulting in the degradation of accuracy of decoding.

SUMMARY OF THE INVENTION

It is therefore an object of the present invention to provide a receiving method for use in a diversity receiver and a device capable of preventing the occurence of an underflow upon demodulation, and conducting effective combination at a maximum ratio by overcoming or improving the aforedescribed disadvantages that are intrinsic to the prior art diversity receiver which performs the conversion of burst signals received, demodulation, combination at a maximum ratio and decoding.

The receiving method for use in the diversity receiver according to the present invention comprises the steps of individually normalizing sample data on each branch system with the maximum absolute value of sample data within a span of one burst on the corresponding branch, and thereafter performing the weighting combination on a symbol-by-symbol basis by multiplying the entire demodulated data for a span of one burst on each branch by the weight obtained based on the ratio of the maximum values for each branch.

The diversity receiver according to the present invention comprises a plurality of A/D converters each for converting one burst of received signals on each branch into a digital value, a plurality of maximum power detectors each for detecting the maximum value in amplitude of the received signal within one burst on each branch, a plurality of normalizers each for normalizing one burst of sample data on each branch, a plurality of demodulators each for demodulating the normalized data, a burst weight calculating block for seeking a weight for each branch on the basis of the maximum value in amplitude for each branch, a plurality of weight controllers each for multiplying the demodulated data for one burst on each branch by the weight on each branch, a combiner for combining the data on each branch at a maximum ratio on a symbol-by-symbol basis to produce one data, and a decoder for performing the decoding operation with the combined data.

The underflow upon demodulation can be prevented by normalizing the sample data on each branch with the maximum absolute value of sample data within a span of one burst for each branch.

In addition, an effective combination at a maximum rate can be done by multiplying the entire demodulated data for one burst on each branch by the weight sought from the maximum absolute value for each respective branch, immediately before the weighting combination for the entire symbol. In particular, it is considered that the aforesaid processing be most effective when the number of quantization bits for the A/D converter is small and a fixed point digital signal processor is used for processing operation.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

Figure 1:
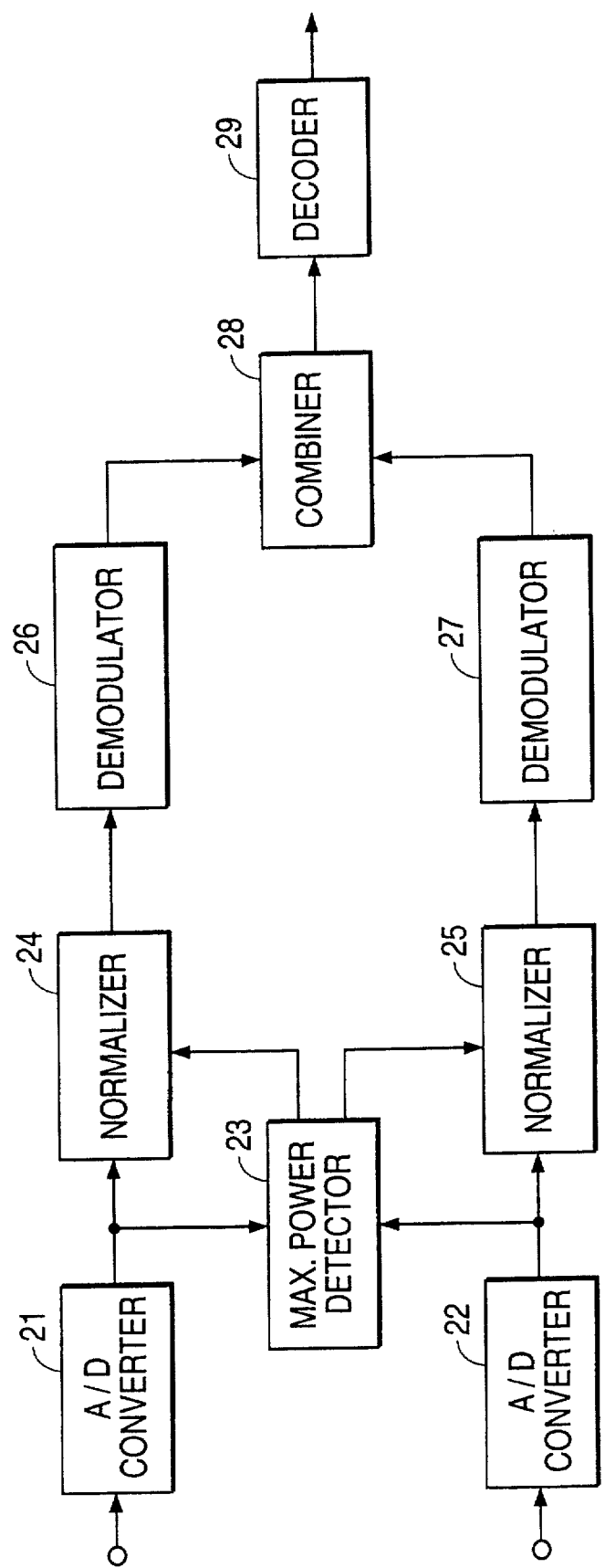
FIG. 1 is a block diagram illustrating the construction of a prior art diversity receiver.
Figure 2:
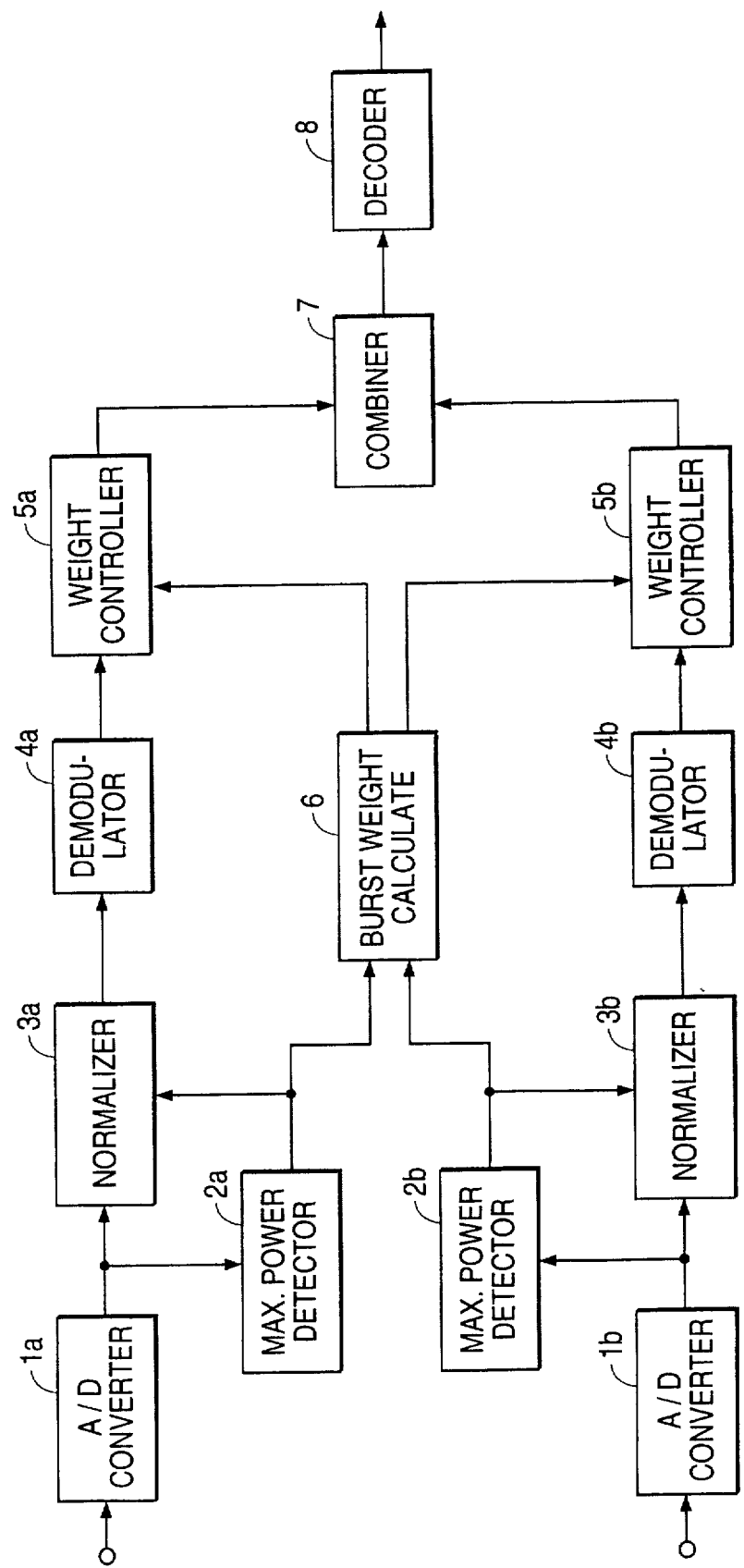
FIG. 2 is a block diagram illustrating the construction of one embodiment of a diversity receiver in accordance with the present invention.

As illustrated in FIG. 2, the diversity receiver according to the present invention has a diversity configuration including two receiving branches as a reception channel system, and comprises A/D converters 1a and 1b, maximum power detectors 2a and 2b, normalizers 3a and 3b, demodulators 4a and 4b, and weight controllers 5a and 5b, each of which being allocated correspondingly to each receiving branch, in addition to a burst weight calculating block 6, a combiner 7 and a decoder 8, all of which being commonly used for the respective branches.

The input signals received through the respective branches are inputted to the respective A/D converters 1a and 1b, converted into digital values on a burst-by-burst basis, and then applied to the maximum power detectors 2a and 2b and the normalizers 3a and 3b. A sampling rate for the digital values, used for conversion at the A/D converters 1a and 1b, may be N times the symbol rate of the signal received, where N is an integer number.

The maximum power detectors 2a and 2b each detect the maximum value in amplitude of one burst of a receiving signal in each branch, that is, the maximum absolute value of sample data, and output the value thereof to the corresponding normalizer 3a or 3b and the burst weight calculating block 6.

The normalizers 3a and 3b each normalize one burst of sample data in digital value inputted from the A/D converter on the basis of the maximum value for each branch system detected at the maximum power detecter 2a or 2b.

The demodulators 4a and 4b each demodulate the normalized data from the normalizer 3a or 3b and apply the output thereof to the weight cotroller 5a or 5b.

The burst weight calculating block 6 compares the maximum values on the respective branch systems, inputted from the maximum power detectors 2a and 2b, to seek relative weights adequate to the respective branch systems, and supplies the results thereof to the weight controllers 5a and 5b.

The weight controllers 5a and 5b each multiply one burst of the entire data from the demodulator 4a or 4b by the weight corresponding to each branch system, and output the result to the combiner 7.

The combiner 7 combines the weighted data inputted from the weight controllers 5a and 5b belonging to the respective branch systems on a symbol-by-symbol basis.

The decoder 8 decodes the combined data inputted from the combiner 7 to produce an output signal.

The weighting operation of the burst weight adjusting block will be herein explained in detail. Assume that the branch system includes two branch systems (a) and (b), and the maximum absolute values for sample data on the branches (a) and (b) are expressed as A and B, respectively. In the case of A>B, the weights on the branches (a) and (b) will become 1.0 and (B/A), respectively. On the other hand, if A<B, the weights on the branches (a) and (b) will become (A/B) and 1.0, respectively. Thus, the data after modulation will be weighted in such a manner that the branch having a higher level becomes 1.0. For example, let it be assumed that the maximum values of absolute values for the sample data on the branches (a) and (b) are 0.8 and 0.5, respectively, the burst weight calculating block provides a weight of 1.0 to the branch (a), and a weight of (0.5/0.8) to the branch (b).

In the event no input is provided from either one of the two reception antennas, any thermal noise on the corresponding branch is to be amplified by normalization. However, the thermal noise after having been amplified will have little effect on the combined signal, since the weight for that channel is usually close to zero.

In the specific embodiment explained above, the number of the receiving branches was assumed to be 2. However, the present invention is not limited to two branches, but can apply to three or more branches as well.

In addition, miniaturization of the device may be achieved by employing a digital signal processor for processing a series of digital data.

It is to be understood that variations and modifications of the diversity receiver disclosed herein will be evident to those skilled in the art. It is intended that all such modifications and variations be included within the scope of the appended claims.

What is claimed is:

1. A receiving method for a diversity receiver, converting burst signals received through a plurality of receiving branches into sample data of digital values in every burst time of each branch, detecting a maximum absolute value in amplitude of sample data within the converted burst signals, normalizing the sample data of each branch using the maximum absolute value of the corresponding branch, demodulating, decoding, and outputting a decoded signal, the receiving method comprising the steps of:

detecting the maximum absolute value of sample data of digital value in one burst in each branch respectively;

normalizing individually the sample data on each branch in said one burst by using the maximum absolute value of the corresponding branch;

demodulating the normalized sample data for each branch in said one burst;

determining the relative weight of each branch for said one burst on the basis of a ratio of the maximum absolute value of each branch to another branch in said one burst;

weighting each symbol for said one burst by multiplying the demodulated data of the corresponding branch by the relative weight of each branch, said symbol comprising at least one sample data in said one burst;

combining all weighted symbols into a combined signal for said one burst by way of a maximum-ratio-combination;

decoding the combined signal to obtain the decoded signal; and outputting the decoded signal.

2. A receiving method according to claim 1, wherein the largest weight of a branch is set as 1.0.

3. A receiving method according to claim 1, wherein the sample data of each branch is obtained at a sample rate of N times a symbol rate, wherein N is an integer number.

4. A diversity receiver for converting burst signals received through a plurality of receiving branches into digital values for each branch respectively, combining the converted digital signals of each branch by way of maximum-ratio-combination, demodulating, decoding, and outputting a decoded signal, said diversity receiver comprising:

- a plurality of analog-to-digital (A/D) converters connected to respective input terminals on said plurality of receiving branches, each of said A/D converters converting one burst of the received signal on each branch into a digital value respectively;
- a plurality of maximum power detection means each detecting a maximum absolute value of one burst of sample data of each branch outputted from each said A/D converter of the corresponding branch;
- a plurality of normalizing means each individually normalizing one burst of sample data on each branch using each maximum absolute value detected by each said maximum power detection means of the corresponding branch;
- a plurality of demodulators each demodulating one burst of data normalized by the corresponding normalizing means of each branch;
- burst weight calculating means for calculating a relative weight of each branch using a ratio of the maximum absolute values detected by each said maximum power detection means;
- a plurality of weight control means each multiplying one burst of data demodulated by the corresponding demodulator by the relative weight of each branch calculated by said burst weight calculating means;
- combining means for combining the plurality of data weighted by said plurality of weight control means into one signal; and
- a decoder for decoding the one signal combined by said combining means to produce the decoded signal.

5. A diversity receiver according to claim 4, wherein each of said A/D converters converts the received signal into the digital value at a sampling rate of N times a symbol rate, wherein N is an integer number.

6. A receiving method for a diversity receiver, comprising:

converting burst signals received through a plurality of receiving branches into sample data of digital values in each burst time of each branch;

detecting a maximum absolute value of the sample data of digital values in one burst time in each branch respectively;

normalizing individually the sample data on each branch in said one burst time by using the maximum absolute value of the corresponding branch;

demodulating the normalized sample data in said one burst time for each branch as demodulated data;

determining the relative weight of each branch for said one burst time on the basis of a ratio of the maximum absolute value of each branch to another branch;

weighting the demodulated data for said one burst time of each branch by multiplying the demodulated data of the corresponding branch by the relative weight of the corresponding branch and outputting weighted data as a result thereof;

combining the weighted data for each branch for said one burst time into a combined signal by way of maximal ratio combining;

decoding the combined signal for said one burst time to obtain a decoded signal; and outputting the decoded signal.

* * * * *